(12) United States Patent
Johnson et al.

(10) Patent No.: US 8,253,580 B2
(45) Date of Patent: Aug. 28, 2012

(54) NATURAL LANGUAGE NAVIGATION FOR POWER MONITORING SYSTEMS

(75) Inventors: Jeffrey Wayne Johnson, Victoria (CA); Thomas Stewart Stevenson, Victoria (CA); Gregory Allen Thompson, Murfreesboro, TN (US); Theresa Krivanek Wall, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 493 days.

(21) Appl. No.: 12/511,786

(22) Filed: Jul. 29, 2009

(65) Prior Publication Data

US 2011/0025516 A1 Feb. 3, 2011

(51) Int. Cl.
*G08B 21/00* (2006.01)
(52) U.S. Cl. .................. 340/657; 704/257; 704/275
(58) Field of Classification Search .................. 340/657; 700/22; 704/257, 270, 275; 709/224
See application file for complete search history.

(56) References Cited

U.S. PATENT DOCUMENTS

| | | | |
|---|---|---|---|
| 6,961,763 B1 * | 11/2005 | Wang et al. | 709/223 |
| 7,693,720 B2 * | 4/2010 | Kennewick et al. | 704/275 |
| 7,949,529 B2 * | 5/2011 | Weider et al. | 704/270 |
| 2007/0033005 A1 | 2/2007 | Cristo et al. | |

FOREIGN PATENT DOCUMENTS

WO 2009/090262 A2 7/2009

OTHER PUBLICATIONS

Written Opinion corresponding to International Patent Application No. PCT/US2010/043089, European Patent Office, dated Jan. 21, 2011, 5 pages.
International Search Report corresponding to International Patent Application No. PCT/US2010/043089, European Patent Office, dated Jan. 21, 2011, 3 pages.
Web pages printed from www.wolframalpha.com (downloaded Jul. 29, 2009); 7 pages.
Wikipedia entry for Wolfram Alpha reporting release of Wolfram Aloha on May 15, 2009 (downloaded Jul. 29, 2009); 4 pages.

* cited by examiner

*Primary Examiner* — John A Tweel, Jr.
(74) *Attorney, Agent, or Firm* — Nixon Peabody LLP (57) ABSTRACT

A method of parsing a natural language phrase to retrieve data associated with a power monitoring system. An input receives a natural language phrase including terms, one of which indicates a data manipulation action for manipulating data of the power monitoring system. A parser component parses the phrase to extract the terms and maps those terms to corresponding category items. The parser component constructs a structured query based on the category items and provides the query to a processor component that retrieves the data from a data source specified in the submitted phrase. The processor component also manipulates the data according to the data manipulation action. The output from the processor component is provided to a presentation component that formats the manipulated data for presentation on a video display, and the formatted manipulated data is displayed on the video display.

20 Claims, 5 Drawing Sheets

NATURAL LANGUAGE NAVIGATION FOR POWER MONITORING SYSTEMS

FIELD OF THE INVENTION

The present disclosure relates to power monitoring systems generally, and, more particularly to natural language navigation for power monitoring systems.

BACKGROUND

Navigation within power monitoring system software typically involves visual identification and selection of objects using a graphical user interface (GUI). To find information of interest, a user must: select a relevant power system software functional module for displaying a particular data type (e.g. a real-time data viewer, an alarm viewer, or a historical trend data viewer); and visually search through a list of available content, or specify data sources, data quantities, and other query information to be used by the selected functional module to produce the desired output.

BRIEF SUMMARY

Power monitoring systems have steadily been growing in terms of points monitored and data captured, with modern systems encompassing hundreds of monitoring points and hundreds of data quantity types. Such large monitoring systems are challenging to navigate using traditional GUI approaches that require the selection of a specific data source and data quantity. Further, the traditional approach of requiring a user to select a specific functional module (and/or associated view) before selecting the content of interest makes it difficult to assemble composite views that draw information from multiple functional modules.

Interest in the data captured by power monitoring systems has also been growing, and such systems are now expected to serve a larger user audience. Where in the past a typical system may have supported a handful of well-trained users, typical systems today serve a larger, more diverse audience of casual users with little or no training. Such users have a sense of the information they wish to obtain (such as energy cost for a particular building) but often lack the technical knowledge and training to successfully navigate the monitoring system to find what they are looking for.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The natural language navigation system addresses the challenges described above by incorporating alphanumeric text input by users to direct navigation and presentation of information by the power monitoring system. Autocompletion is combined with knowledge of past user submissions to provide query suggestions designed to aid users in finding the information they are looking for.

Figure 1:
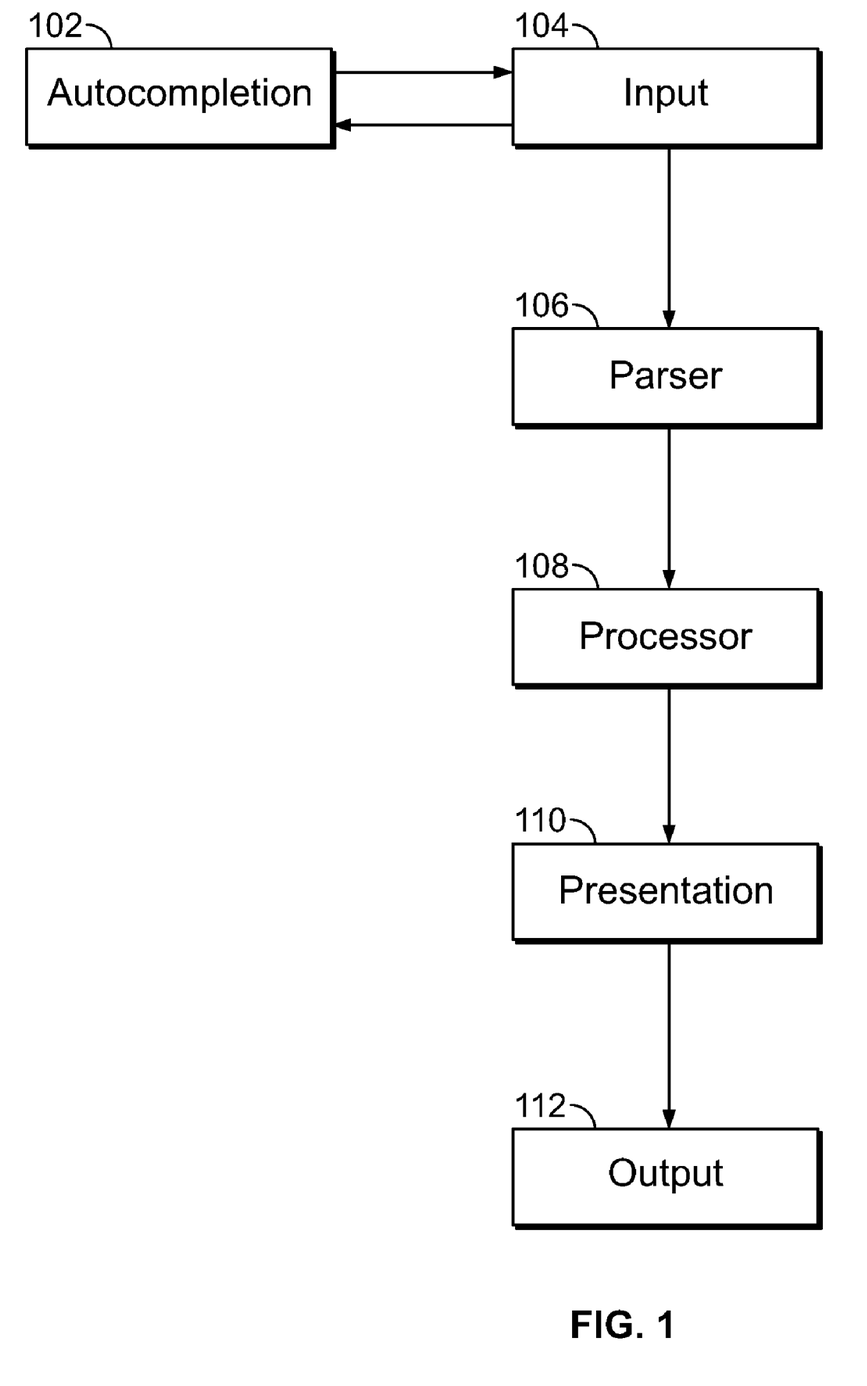
FIG. 1 is a block diagram of the main components used by the natural language navigation system.

FIG. 1 is a block diagram of the main components used by the natural language navigation system. The Input 104 represents alphanumeric input from a user, which is composed of a natural language phrase consisting of one or more terms (composed of alphanumeric characters such as words or abbreviations). A natural language phrase entered by a user may be in the form of a natural language query, such as "What is the kW demand at Building A right now?" Alternately, a natural language phrase may simply contain the key elements of the information sought by a user, such as "kW demand Building A now." As a user inputs a phrase, an Autocompletion component 102 can optionally provide guidance by suggesting possible complete phrases that consist of terms already entered and possible additional terms. A user can select one of the suggestions suggested by the Autocompletion component 102 for submission to the Parser component 106, or can continue to type in the natural language phase while viewing updated real-time suggestions from the Autocompletion component 102.

The Parser component 106 accepts the submitted natural language phrase and extracts one or more terms from the phrase. The terms are typically separated by a space though not necessarily. For example, "Building A" or "September 2008" can be a term. The Parser component 106 constructs one or more formal queries for retrieval by a Processor component 108 by mapping extracted phrase terms to corresponding category items that provide the context required to determine the structured query elements required. Each category item represents an element of a structured query.

As an example, terms in the natural language phrase "kW demand Building A now" maps "kW demand" to a data quantity category, "Building A" to a data source category and "now" to the data manipulation action or selection criteria required to acquire and display real-time data. The Parser component 106 constructs a query to the Processor component 108 for the current value of the kW demand measurement from the monitoring device associated with Building A. The Processor component 108 in turn retrieves the information requested in the query and provides the query results to a Presentation component 110.

It should be emphasized that the natural language phrase can include one or more terms that imply or indicate one or more data manipulation actions to perform. As an example, the natural language phrase "kWh last month BuildingA vs BuildingB normalize by sq.ft." would retrieve total kWh consumption for both BuildingA and BuildingB over the previous month and then normalize those values by the floor space (in sq. ft.) to present comparable measures of efficiency. In this example, the power monitoring system does not compute the kWh per sq. ft. for each building in advance; rather, it performs this calculation on demand based on the resolved meaning of the phrase snippet "normalize by sq. ft." A number of standard data manipulation actions can be pre-defined in the power monitoring system, as set forth herein, and can be suggested by the Autocompletion module 102 based on previous natural language phrase submissions by the user.

Power monitoring systems generate a rich variety of data types (interchangeably called "types of data") that can be manipulated and presented to a user. Data types can include real-time, historical trend, alarm, diagnostics, waveform, and power quality data. The data types are handled by different functional modules in the Processor component 108. The functional module for the real-time data type is a real-time data module that processes data representing one or more electrical characteristics being monitored by the power monitoring system in real-time as they are being measured by a monitoring point in the power monitoring system. The functional module for the historical trend data type is a historical trend data module that processes the data representing one or more electrical characteristics being monitored by the power monitoring system over a predetermined historical time period as the characteristics were measured by a monitoring point in the power monitoring system. The functional module for the alarm data type is an alarm module that processes one or more alarm events indicating whether one or more electrical characteristics measured by a monitoring point in the power monitoring system exceeds a predetermined alarm threshold. The functional module for the diagnostics data type is a waveform data module that processes waveform capture data representing one or more electrical characteristics measured by the monitoring point in the power monitoring system. The functional module for the power quality data type is a power quality event module that retrieves a range of power quality event data from a requested data source in the power monitoring system.

Data manipulation actions performed on these types of data generally produce manipulated data and can include generating a statistical summary of a selected data set (such as finding the minimum, maximum, and average values) or selecting a data set, such as for a particular measurement, data source, and/or time range (e.g., "September 2008"). Data manipulation actions can also include performing one or more calculations or arithmetic operations such as summation and scaling (e.g. calculating energy consumption per square foot). Instead of merely interpreting the words in a submitted term, the Parser component 106 in conjunction with the Processor component 108 go further by executing or carrying out an action to manipulate the data in the power monitoring system when it recognizes a submitted term as indicating a data manipulation action. In other words, in the example above, the data requested from a physical or virtual monitoring point is kWh, and the data type is real-time. The term "normalize by sq. ft." is interpreted by the Parser component 106 to indicate a data manipulation action to manipulate the kWh data in a certain way, here to normalize kWh consumption by square foot based on the known square footage of each of Buildings A and B. Another way of manipulating the data is to organize the requested data into a group or set of data, such as all data quantities that were measured during the month of September 2008. Thus, instead of providing merely last month's kWh consumptions for Building A and for Building B, the Processor component 108 carries out a series of calculations to normalize their total consumption by square foot, and provides the calculated normalized values as manipulated data to the Presentation component 110.

In response to receiving one or more queries from the Parser component 106, the Processor component 108 retrieves the information requested in the one or more queries and generates an output that is received by the Presentation component 110 and assembled into an Output 112 of one or more results for the user. Each result is presented in a format relevant to the data type involved. Results can be directly related to the natural language phrase submitted by the user (containing, for example, a measurement requested by the user) or can present data related to the natural language phrase submitted by the user, as judged by previous user submissions and actions.

A user can click on the highlighted title of a result to jump to a more detailed view.

As an example, in response to the natural language phrase "kW demand Building A," the Parser component 106 can generate a query for all data types available for the measurement "kW demand." The output from the Processor component 108 can be assembled by the Presentation component 110 into a composite Output 112 including the current (and updating) value of kW demand for Building A and a trend of kW demand for Building A over the last several days. After tracking several user natural-language phrase submissions, the Presentation component 110 can output for display on a video display (not shown) an indication that users often search for both kW demand and kWh measurements, and can include popular or frequently used kWh measurement results for Building A in a "Related Results" section in Output 112. Clicking on or selecting the highlighted title for each result leads the user to a view with more detailed information.

Figure 2:
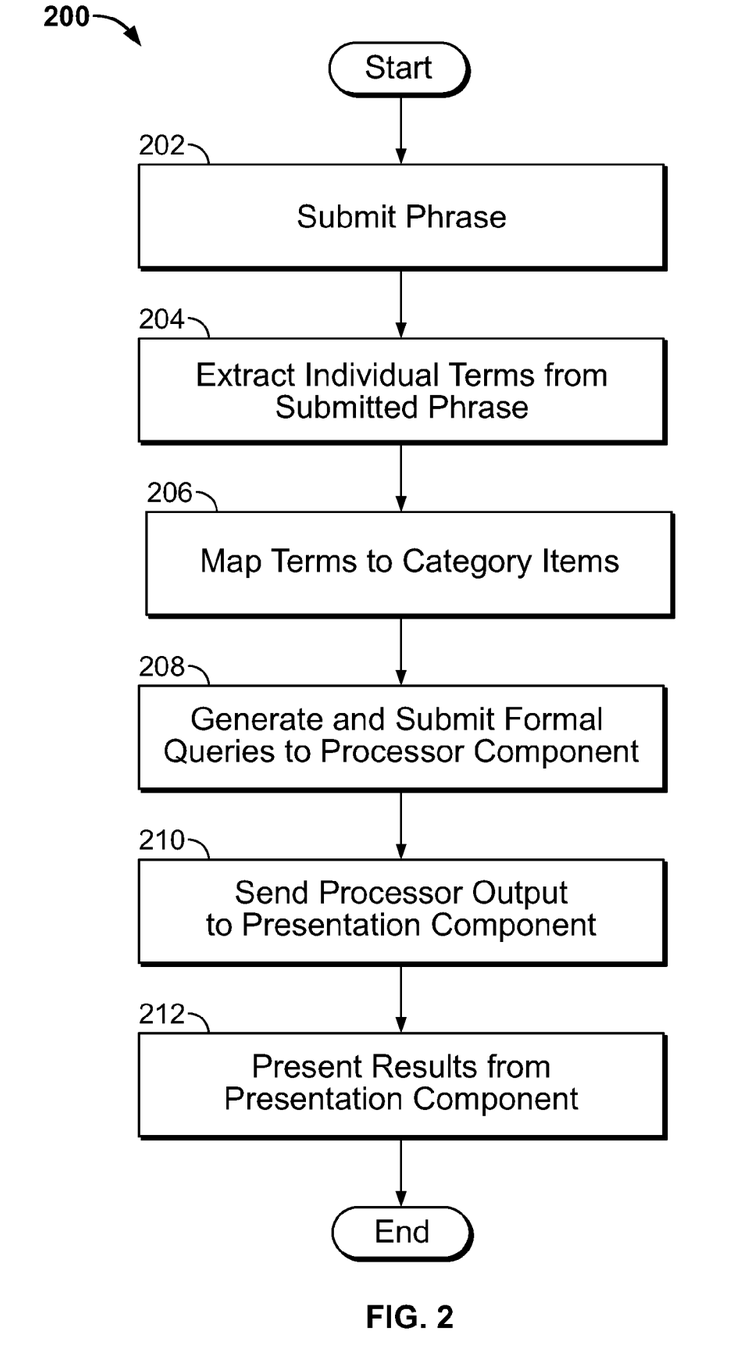
FIG. 2 is a flowchart of a natural language navigation approach.

FIG. 2 is a flowchart 200 of a natural language navigation approach. A user submits a navigation request in the form of a natural language phrase composed of one or more terms (202). Terms can indicate the content of interest, such as a data quantity (such as kWh) or a data source (such as Building A). Terms can also further indicate a data manipulation action, such as the selection of data within a date range (e.g. "September 2008"), as mentioned above.

The Parser component 106 extracts the individual terms from the submitted natural language phrase (204) and maps these terms to category items (206). These two blocks highlight a key purpose of the Parser component 106, which is to translate natural language navigation requests from a user into the structured queries required by the Processor component 108.

One or more structured queries are generated by the Parser component 106 and submitted to the Processor component 108 (208). The Processor component 108 processes received queries and submits output to the Presentation component 110 (210).

The Presentation component 110 receives an output from the Processor component 108 and organizes and formats the Output 112 to produce a summary of results (212). The summary results view includes several displayable elements, including an input field displaying the last natural language phrase entered and one or more results. Each result includes a title portion and a data portion, with the title portion highlighted as a link and the data portion in a format relevant for the data type involved. The highlighted title link can be followed to a detailed view containing related information.

Figure 3:
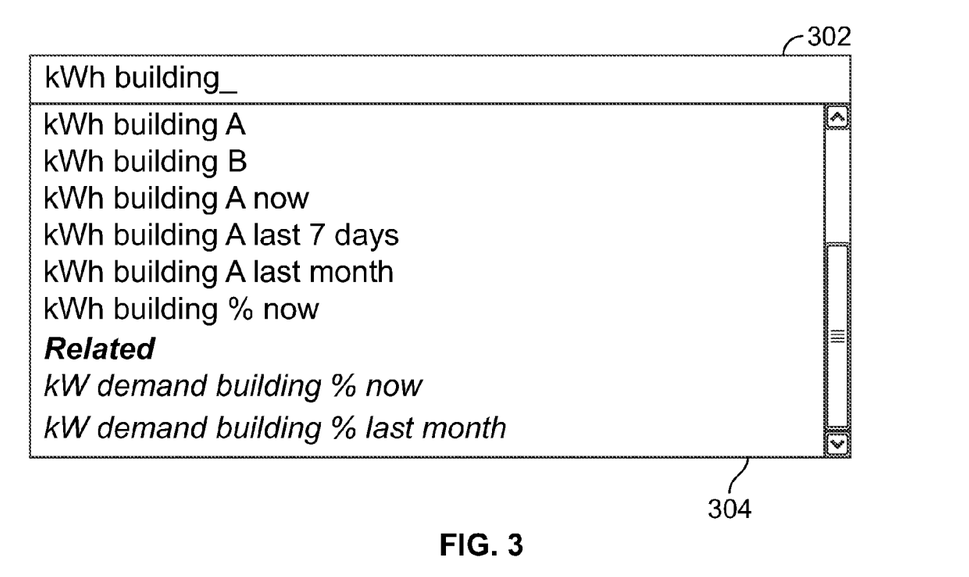
FIG. 3 is an illustration of an Input Field displayed on a video display showing suggested complete natural language phrases shown in a Drop-Down Box.

FIG. 3 is an exemplary illustration of an Input Field 302 displayed on a video display showing suggested complete natural language phrases shown below the Input Field 302 in a Drop-Down Box 304. As a natural language phrase is entered, the suggested phrases in the Drop-Down Box 304 will include the phrase terms and partial terms already entered, as well as additional suggested terms. Suggested phrases can be updated dynamically by the Autocompletion component 102 as the user enters the natural language phrase into the Input Field 302. The Autocompletion component 102 retains a record of past natural language phrase submissions and can use one or more of the following strategies to generate suggested natural language phrases:

- Frequency of use: suggested terms are added to the current partial phrase to match past natural language phrase submissions, ordered by frequency of use.
- Chronological: suggested terms are added to the current partial phrase to match past natural language phrase submissions, presented in chronological (or reverse chronological) order.
- Alphabetical order: suggested terms are added to the current partial phrase to match past natural language phrase submissions, presented in alphabetical (or reverse alphabetical) order.
- Related: suggested terms provided are related to terms in the current partial phrase entered by the user. Related terms can be predefined (e.g. "kW demand related to kWh") or determined by tracking past natural language phrase submissions.

When generating suggested phrases, the Autocompletion component 102 can access past natural language phrase submissions entered by all users of the power monitoring system, or by some group of users, or by an individual user, or some combination thereof. When there is no exact match for an apparently complete term in the natural language phrase being entered by a user, pattern matching techniques can be used to suggest terms with the strongest correlation to the apparently complete term. For example, if a user mistakenly starts entering "kWh building A" as a natural language phrase, but has previously used the term "building," the Autocompletion component 102 can include the suggested term "building" in the set of suggested phrases.

Different text colors or emphasis for terms and partial natural language phrases can be used to indicate when the natural language navigation system has enough information to complete a navigation request. The color or emphasis used can indicate the "strength" of the partial phrase currently entered; terms mapping to multiple categories may be considered a "stronger" match, for example, than terms which map to just one category. Bolder, stronger colors (such as red, black) can indicate a strongly matched entry, while muted, lighter colors (such as yellow, light green) can indicate a weaker matched entry.

A user can explicitly store and label select natural language phrases as bookmarks, which can be recalled and used for power monitoring system navigation in the future. A user can optionally attach additional metadata (such as notes and tags) to bookmarks to aid in their organization and retrieval.

Natural-language phrase suggestions generated by the "related" strategy above can be grouped separately from other natural-language phrase suggestions by the Autocompletion component 102 and visually presented separately in the Drop-Down Box 304. Such related natural language phrases provide a mechanism for introducing the user to relevant data related to their navigation request that they may not be aware exists.

In the example shown in FIG. 3, a user has entered "kWh building" into the Input Field 302, and the Autocompletion component 102 has produced and displayed a set of suggested phrases in the Drop-Down Box 304 that include the terms already entered by the user. By accessing a database of past submissions, the Autocompletion component 102 has generated a set of suggested natural language phrases, including partial natural language phrases (such as "kWh building A") that the user can accept and build upon further before submission. Note that the last two suggested natural language phrases include the wildcard character "%", which can be used as a placeholder for one or more characters in a natural language phrase. In the example shown in FIG. 3, the "building %" term specifies that all data sources with a name beginning with "building" should be included in the navigation request. The use of wildcard characters is discussed in more detail below.

The Drop-Down Box 304 also includes two suggested natural language phrases under the Related section that include the "kW demand" measurement. A user interested in building energy costs, for example, and searching for monthly kWh values can also see a related phrase suggestion that includes monthly maximum kW demand values for the same building.

Figure 4:
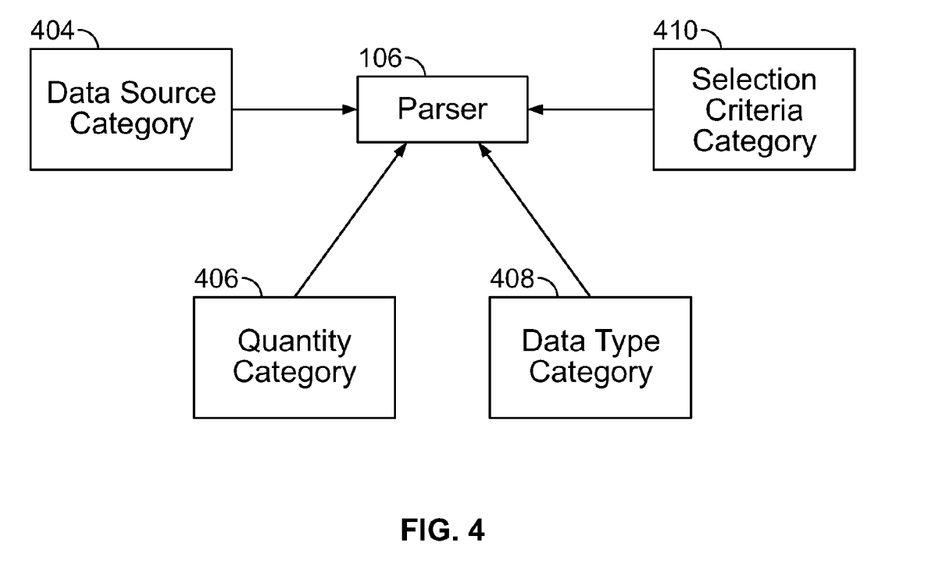
FIG. 4 is a block diagram showing the mapping of terms from a natural language phrase to one or more category items.

The mapping of terms from the natural language phrase to one or more category items is illustrated by the block diagram shown in FIG. 4. In general, the parsing of natural-language phrase terms to structured queries that are more easily understood by the power monitoring system is aided by look-up tables organized by one or more categories relevant and related to a modem power monitoring system. In FIG. 4, the Parser component 106 is shown to reference four different category items:

- Data Source Category 404: this category item refers to a collection of expressions that map the relationship between terms and corresponding data sources in the power monitoring system. A data source represents a physical or virtual monitoring point, in the power monitoring system, which measures or senses one or more electrical characteristics and produces data indicative of the measured or sensed electrical characteristics. A virtual monitoring point is typically a software module in the power monitoring system that derives its monitored data from other physical monitoring points in the power monitoring system, such as by adding or subtracting data from other monitoring points.
- Quantity Category 406: this category item refers to a collection of expressions that map the relationship between terms and measurement quantities that are measured by a physical or virtual monitoring point in the power monitoring system.
- Data Type Category 408: this category item refers to a collection of expressions that map the relationship between terms and data types generated by the power monitoring system.
- Selection Criteria Category 410: this category item refers to a collection of expressions that map the relationship between terms and selection criteria that should be used in structured queries, for selecting a range (e.g., now, last seven days) of data according to a criterion (in this example, the criterion is time).

The Parser component 106 compares natural-language phrase terms with one or more category items from the category items above to build one or more structured queries for the Processor component 108 that will return the results that optimally match the intention of the natural language phrase submitted by a user. Category items can be a name or a label that is directly mapped with phrase terms (such as a Data Source Category 404 item like "Building A") or can be more complex expressions that map to particular natural-language phrase terms (such as mapping the term "now" to the Selection Criteria Category 408 item that directs the retrieval of the most current reading).

Figure 5:
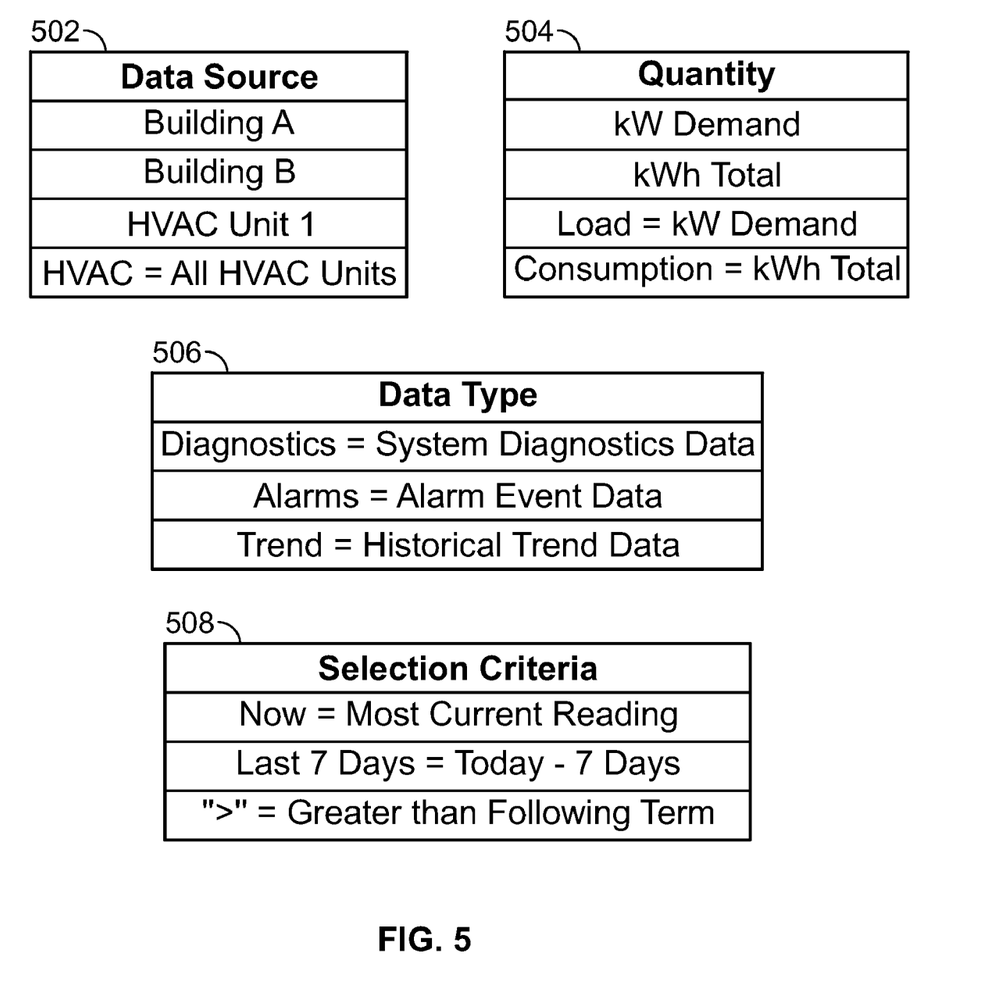
FIG. 5 illustrates exemplary category items for the data source, quantity, and selection criteria categories.

FIG. 5 illustrates exemplary category items for the data source, quantity, and selection criteria categories. Using these example category items, the Parser component 106 can map natural-language phrase terms to one or more category items as shown in the input natural language phrase and Table 1 below:

Input natural language phrase: "kW demand Building A trend last 7 days"

TABLE 1

Phrase Term to Category Item Mapping

| Phrase Term | Category | Item |
|---|---|---|
| kW demand | Quantity | kW demand |
| Building A | Data Source | Building A |
| trend | Data Type | Historical trend data |
| last 7 days | Selection Criteria | today - 7 days |

In the Table 1 example above, the Parser component 106 uses the mapping shown in Table 1 to construct a structured query for the Processor component 108 that retrieves kW demand measurements for Building A for the past 7 days.

As noted above, category items can be names or labels that directly match terms included in a submitted natural language phrase. Category items can also be pattern-matching expressions that map a natural-language phrase term (or some portion of a term) to information that can be used in a structured query to the Processor component 108. Pattern-matching expressions can make use of common wildcard characters (such as % and *) and/or regular expressions. Referring to FIG. 5, the last example Data Source 502 item is "HVAC=all HVAC units," which would direct the Parser Module 106 to map the natural-language phrase term "HVAC" into a structured query for all data sources that contain "HVAC" in their name. In another example, the third Quantity 504 item "load=kW demand" maps the natural-language phrase term "load" to the specific measurement quantity "kW demand." In yet another example, the third Data Type 506 item "Trend=Historical Trend Data" maps the natural-language phrase term "trend" to "historical trend data."

Selection Criteria 508 category items typically map natural-language phrase terms specifying data subsets to an associated portion of a structured query. Such natural-language phrase terms can specify a date range of interest, as shown in the first two example items in the Selection Criteria 508 category in FIG. 5. Natural-language phrase terms can also include the use of operators such as ">" (greater than) and "<" (less than), which the Parser component 106 interprets to mean the data subset that is greater or less than the term which immediately follows the operator. As an example, the input phrase "kW demand>50" would result in a structured query that instructs the Processor component 108 to retrieve all kW demand values greater than 50 kW.

The Parser component 106 can also support the use of Boolean logic operators such as AND, OR, and NOT within submitted natural language phrases. As an example, the input natural language phrase "Building % kW demand NOT (Building A)" would result in a structured query designed to retrieve all kW demand values for all building data sources except for Building A.

The Parser component 106 can also support the use of natural-language phrase terms that direct the Processor component 108 to use a data manipulation action to manipulate the data retrieved prior to passing the data to the Presentation component 110. For example, the input natural language phrase "Building A kW demand September 2008 maximum" results in a structured query designed to retrieve all kW demand values for Building A in September 2008 and to direct the Processor component 108 to find the maximum value and provide that maximum value to the Presentation component 110.

The relationship between natural-language phrase terms and category items can be one-to-one, one-to-many or many-to-one. In a one-to-one relationship, a single natural-language phrase term will match just one category item. Alternately, a natural-language phrase term can match more than one category item (a one-to-many relationship) or more than one term in a natural language phrase can match a single category item (a many-to-one relationship). As required, the Parser component 106 will generate multiple structured queries for the Processor component 108 to accommodate all term-to-category-item mappings determined for an input phrase.

When a term-to-category-item mapping does not yield enough information to build a complete structured query, the Parser component 106 can use one or more of the following strategies to build a complete structured query:

Inferred action: use additional logic and metadata to infer which elements are required to build a complete structured query.

Default action: add elements to a structured query according to pre-defined defaults.

User prompt: prompt the user to provide the additional information required to complete a structured query.

Table 2 provides several examples involving the use of each of the foregoing strategies.

TABLE 2

Structured Query Completion Examples

| Phrase | Missing Element | Parser Module Action |
|---|---|---|
| "kWh Building A" | Data Type | Look up kWh quantity metadata to determine that the data type is 15 minute cumulative interval data. The Inferred data type is historical trend. |
| "April 2008" | Data Source Data Type Quantity | Prompt the user for data source, quantity and data type of interest in the power monitoring system. |
| "2007 alarms" | Data Source | Pre-defined default for the alarm data type is to provide alarm data for all data sources in the power monitoring system. |

The power monitoring system can also keep track of unknown natural-language phrase terms in submitted natural language phrases so that an administrative user can review frequently occurring unknown terms. The administrative user can create new category items that map to one or more of the unknown terms so that future user navigation requests will be successful. The administrative user can also isolate terms that imply a data manipulation action and program the Parser component 106 and the Processor component 108 to perform the desired data manipulation action.

Figure 6:
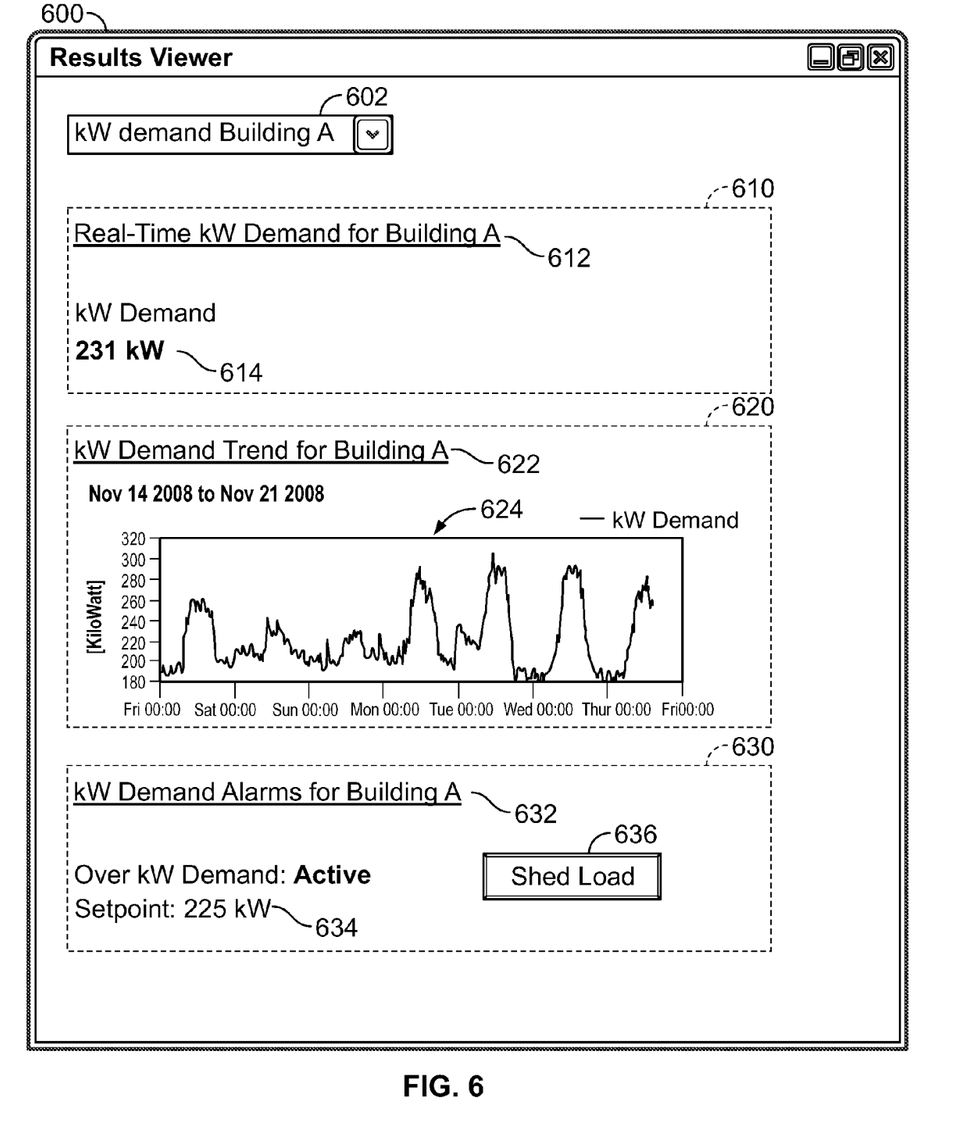
FIG. 6 is an exemplary user interface display of a Results Viewer that illustrates the Output from the Presentation component displayed on a video display.

FIG. 6 is an exemplary user interface display of a Results Viewer 600 that illustrates the Output 112 from the Presentation component 110 displayed on a video display. In this example, the Input Field 602 is located in the top portion of the Results Viewer 600 and displays the natural language phrase entered, which is a navigation request for the kW demand measurement quantity for Building A. The Result 610 shows the real-time kW Demand 614 for Building A, and the value 614 updates in real time as new measurement values are received by the power monitoring system. The Result 620 shows a trend 624 of kW demand measurements for Building A for the last seven days based on historical trend data provided by the power monitoring system. The Result 630 shows the currently active "Over kW Demand" alarm 634 for Building A along with a Shed Load button 636 that can be activated by the user to reduce the kW demand load of Building A. The Result Titles 612, 622, and 632 are highlighted as links or hyperlinks that can be followed to one or more views with additional relevant details. A touchscreen can be optionally coupled to the video display to permit user selection of the links by touching the Result Titles 612, 622, 632.

The Presentation component 110 maintains a record of input natural language phrases entered and submitted in the past and the associated results that were displayed. The Presentation component 110 can use one or more of the following strategies to determine the order in which summary results are presented on a video display:

Frequency of use: results are ordered by the frequency with which a user selects the title of results presented in the past.

Chronological: results are presented in chronological (or reverse chronological) order, based on the date on which they were last presented. Alternately, the order of current summary results can be based on dates attached to data within the current set of results.

Alphabetical order: results are presented in alphabetical (or reverse alphabetical) order.

In determining the order in which to present results, the Presentation component 110 can access past results presented to all users of the power monitoring system, or by some group of users, or by an individual user, or some combination thereof.

A user can store and label select results (or result views) as bookmarks, which can be recalled and presented again in the future. A user can optionally attach additional metadata (such as notes and tags) to bookmarks to aid in their organization and retrieval, as mentioned above.

The natural language navigation system can optionally support a security model that controls the results and views presented to a user on the video display. For example, the security model can define the data sources and/or measurements available to a user, and prevent the user from viewing data that they do not have access to. If a user does not have access to a portion of data contained within a result, the Presentation component 110 can remove the entire result, or can present only data that the user has access to and optionally a message indicating the imposed security restrictions.

The electrical characteristics can include voltage, current, harmonic magnitudes, power factor, vars, volt-amps, frequency, power demand, or energy demand.

It should be noted that the modules and components illustrated and discussed herein perform particular functions and interact with one another. It should be understood that these modules or components are merely segregated based on their function for the sake of description and represent any combination of computer hardware and/or executable software code, which is stored on a computer-readable medium for execution on appropriate computing hardware. The various functions or functionalities of the different modules and components can be combined or segregated as hardware and/or software stored on a computer-readable medium as above as modules or components in any manner, and can be used separately or in combination.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of parsing a natural language phrase to retrieve data associated with a power monitoring system, comprising:

receiving a natural language phrase including one or more terms composed of alphanumeric characters, the terms including at least one term that indicates a data manipulation action for manipulating data of the power monitoring system, the data having a data type;

parsing the phrase to extract the one or more terms;

mapping each of the one or more terms to one or more category items, wherein the category items include a data quantity category indicating a quantity of data representing one or more electrical characteristics measured by a monitoring point in the power monitoring system, a data source category indicating a source of the data measured by the monitoring point, and a selection criteria category indicating the data manipulation action to be performed on the data measured by the monitoring point;

constructing a structured query based on the one or more category items;

responsive to receiving the structured query, retrieving the data from the data source mapped to the data source category and manipulating the data according to the data manipulation action mapped to the selection criteria category to produce manipulated data;

formatting at least the manipulated data for presentation on a video display to produce formatted manipulated data; and displaying the formatted manipulated data on the video display.

2. The method of claim 1, wherein the manipulating the data according to the data manipulation action includes generating a statistical summary of the data.

3. The method of claim 2, wherein the generating the statistical summary of the data includes locating a minimum, maximum, or average value in the data.

4. The method of claim 1, wherein the manipulating the data according to the data manipulation action includes organizing the data into a set of data over a time range.

5. The method of claim 1, wherein the manipulating the data according to the data manipulation action includes performing a calculation on the data.

6. The method of claim 1, further comprising automatically suggesting, as the phrase is being entered, at least one suggested term based on at least one criterion.

7. The method of claim 6, wherein the at least one criterion is a frequency of use of past terms that have already been entered.

8. The method of claim 6, wherein the at least one criterion is a chronological order of past terms that have already been entered.

9. The method of claim 6, wherein the at least one criterion is an alphabetical order of past terms that have already been entered.

10. The method of claim 6, wherein the at least one criterion is a correlation between the term being entered and the past terms that have already been entered.

11. The method of claim 10, wherein the at least one suggested term is a plurality of suggested terms, the method further comprising indicating a strength of the correlation by displaying each of the plurality of suggested terms in respective colors indicative of the respective correlation strengths.

12. The method of claim 1, wherein the one or more functional modules include a real-time data module that processes data representing the one or more electrical characteristics in real-time as the one or more electrical characteristic is being measured by the monitoring point in the power monitoring system.

13. The method of claim 1, wherein the one or more functional modules include a historical trend data module that processes data representing the one or more electrical characteristics over a predetermined historical time period as the one or more electrical characteristics were measured by the monitoring point in the power monitoring system.

14. The method of claim 1, wherein the one or more functional modules include an alarm module that processes one or more alarm events indicating whether the at least one or more electrical characteristics measured by the monitoring point in the power monitoring system exceeds a predetermined alarm threshold.

15. The method of claim 1, wherein the one or more functional modules include a waveform data module that processes waveform capture data representing one or more electrical characteristics measured by the monitoring point in the power monitoring system.

16. The method of claim 1, wherein the one or more functional modules includes a diagnostics module that processes information indicative of a diagnostic criterion for analyzing data measured by one or more power monitoring devices in the power monitoring system.

17. The method of claim 1, wherein the one or more functional modules includes a power quality event module that retrieves a range of power quality event data from a requested data source in the power monitoring system.

18. The method of claim 1, wherein the at least one or more electrical characteristics include voltage, current, harmonic magnitudes, power factor, vars, volt-amps, frequency, power demand, or energy demand.

19. The method of claim 1, wherein the monitoring point is a physical monitoring device or a virtual monitoring point in the power monitoring system, wherein the virtual monitoring point derives monitored data from other monitoring points in the power monitoring system.

20. A system for parsing a natural language phrase to retrieve data associated with a power monitoring system, comprising:
an input that receives natural language phrase including one or more terms composed of alphanumeric characters, the terms including at least one term that indicates a data manipulation action for manipulating data of the power monitoring system, the data having a data type;
a parser component that:
parses the phrase to extract the one or more terms,
maps each of the one or more terms to one or more category items, wherein the category items include a data quantity category indicating a quantity of data representing one or more electrical characteristics measured by a monitoring point in the power monitoring system, a data source category indicating a source of the data measured by the monitoring point, and a selection criteria category indicating the data manipulation action to be performed on the data measured by the monitoring point, and
constructs a structured query based on the one or more category items;
a processor component that, responsive to receiving the structured query, retrieves the data from the data source mapped to the data source category and manipulates the data according to the data manipulation action mapped to the selection criteria category to produce manipulated data;
a presentation component that formats the manipulated data for presentation on a video display to produce formatted manipulated data; and
an output that displays the formatted manipulated data on the video display.

* * * * *